United States Patent [19]

MacLeod

[11] 4,168,883
[45] Sep. 25, 1979

[54] ARRANGEMENT TO CONNECT A LASER TO AN OPTICAL FIBER TRANSMISSION LINE

[75] Inventor: Alexander MacLeod, Leeds, England

[73] Assignee: International Standard Electric Corporation, New York, N.Y.

[21] Appl. No.: 856,071

[22] Filed: Nov. 30, 1977

[30] Foreign Application Priority Data

Dec. 14, 1976 [GB] United Kingdom ............... 52110/76

[51] Int. Cl.² ................................................. G02B 5/14
[52] U.S. Cl. .................................. 350/96.20; 250/552; 350/96.21
[58] Field of Search ............... 350/96.20, 96.21, 96.22; 250/227, 552; 357/18

[56] References Cited

U.S. PATENT DOCUMENTS

| 3,982,815 | 9/1976 | Nakayama | 350/96.22 |
| 4,003,074 | 1/1977 | Yonezu et al. | 357/18 |
| 4,015,894 | 4/1977 | Rocton | 350/96.21 |
| 4,065,203 | 12/1977 | Goell et al. | 350/96.20 |
| 4,076,376 | 2/1978 | Slaughter | 350/96.21 |
| 4,119,363 | 10/1978 | Camlibel et al. | 350/96.20 |

FOREIGN PATENT DOCUMENTS 2611658  9/1977  Fed. Rep. of Germany ........ 350/96.21

*Primary Examiner*—John K. Corbin
*Assistant Examiner*—Stewart Levy
*Attorney, Agent, or Firm*—John T. O'Halloran; Alfred C. Hill

[57] ABSTRACT

A laser mounting package includes a ferrule containing an optical fiber held in it by jewels at each end of the fiber, the laser being mounted adjacent one end of the fiber. The laser is enclosed by an outer housing and the ferrule is mateable with a ferrule ended optical fiber transmission line.

8 Claims, 3 Drawing Figures

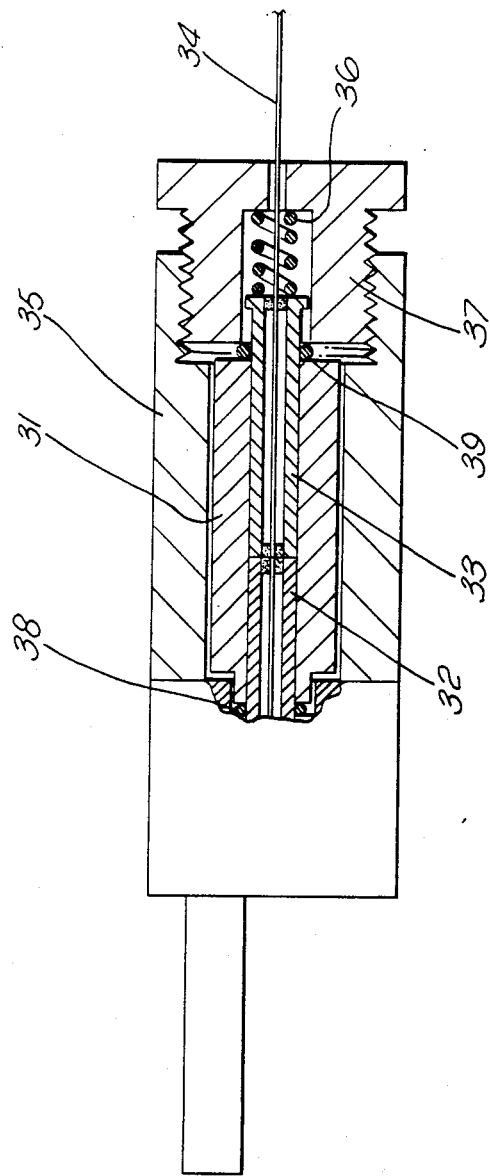

ARRANGEMENT TO CONNECT A LASER TO AN OPTICAL FIBER TRANSMISSION LINE

BACKGROUND OF THE INVENTION

This invention relates to a mounting arrangement for a solid state laser, especially for coupling the laser to an optical fiber transmission line.

SUMMARY OF THE INVENTION

An object of the present invention is to provide an improved laser mounting arrangement for connection to an optical fiber transmission line.

A feature of the present invention is the provision of a laser mounting arrangement comprising: a laser mounted adjacent one end of a length of a first optical fiber transmission line mounted in a first ferrule, the other end of the first optical fiber transmission line being mated with an end of a second optical fiber transmission line.

BRIEF DESCRIPTION OF THE DRAWING

Above-mentioned and other features and objects of this invention will become more apparent by reference to the following description taken in conjunction with the accompanying drawing, in which:

FIG. 3 is a longitudinal cross-sectional view of how a package such as that of FIG. 1 is terminated in an optical fiber transmission line.

DESCRIPTION OF THE PREFERRED EMBODIMENT

Figure 1:
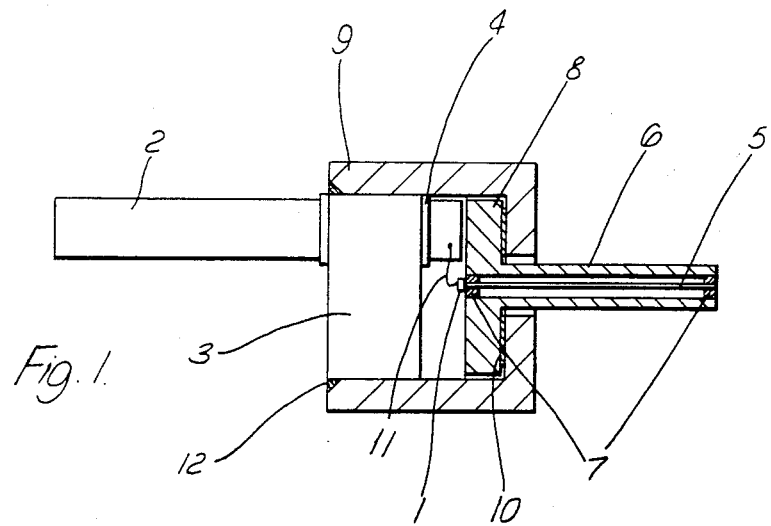
FIG. 1 is a longitudinal cross-sectional view of a laser mounting package for a pulsed laser.

In the arrangement shown in FIG. 1 the input to the laser 1 uses a stripline 2, which is assembled to a header 3. Header 3 is made of copper and subsequently gold plated. The assembly is made using for electrical insulation either an epoxy film supported on glass fabric or a low melting point glass frit in tape form, as indicated at 4.

A length of optical fiber 5 acts as an optical window between the laser 1 and the optical fiber line which it is to feed, fiber 5 being mounted within a ferrule 6 by two watch jewels 7 one at each end. This ferrule has a flange 8 which is mounted within the outer package or housing 9, the flange 8 being spaced from the inside of the package 9 by a sealing washer 10 of solder or an epoxy material. These elements when thus assembled are glued or otherwise secured together as shown.

The laser 1 is secured to the ferrule 6-8 in proper alignment with the optical fiber therein, and is connected by a flying lead 11 to the end of the strip line 2. The metallic body of the package forms the connection for the other terminal of the laser. Finally head 3 is sealed into package 9 by an epoxy or solder ring 12.

Figure 2:
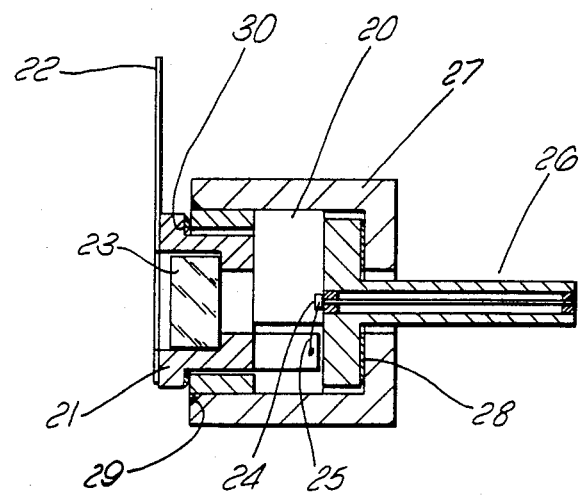
FIG. 2 is a longitudinal cross-sectional view of a laser mounting package for a CW laser.

In FIG. 2, which, as mentioned, is for a CW laser the header 20 is attached by an epoxy or glass seal 30 to a ferrule 21 carrying the strip line 22. This ferrule 21 has a glass window 23 fixed therein by epoxy, or by metallizing the glass rim and then soldering it to the ferrule 21. This window enables the operation of the laser 24 to be monitored from the rear of the package.

The laser chip 24 is soldered to the header 20 with the axis of the chip parallel to the header axis, and on its center line. However, the laser itself is electrically isolated from the header. The front face of the chip is as near as possible to but does not overhang the front face of the header. The top or cathode contact of the laser is made by wire bonding 25 or soldering to the stripline.

The ferrule 26 is similar to that of FIG. 1 and is similarly mounted in the outer package 27, the ferrule assembly being positioned on the front face of the header and micro-manipulated to achieve maximum coupling to the laser. The two parts, i.e. ferrule and header are temporarily joined by glueing or welding. The subassembly thus produced is inserted into the outer package 27, the fit being a light force-fit to obtain good heat sinking properties. The epoxy or solder washer 28 seals the front of the passage, and epoxy or solder ring 29, seals the rear of the package.

FIG. 3 shows how a package such as FIG. 1 is coupled to an optical fiber transmission line, but it should be noted that a package such as FIG. 2 is coupled in the same manner as that shown.

The coupling includes a tube 31 with a precision bore which aligns the ferrule 32 of the laser package with another ferrule 33 at the end of the optical fiber transmission line 34. This tube 31 is held in place by a housing 35 which screws on to the laser package, which allows disconnection if it is necessary to clean the fiber window. The precision bored tube 31 is a loose fit in the housing 35, so that any eccentricity caused by the alignment of the fibers is taken up.

As already stated, the fiber line 34 is terminated by a jewelled ferrule 33, which has a spring 36 behind it, held by a locking nut 37. When the nut 37 is screwed into the housing 35, the ferrule 33 is pressed against the package ferrule 32 by spring urgence. The locking nut also compresses the sealing rings 38, 39, which protect the fiber-to-fiber joint from the ingress of dust and grit.

Packages such as described above provide a seal between the laser and the environment. The device-fiber alignment is performed during the assembly operation, which avoids the need for alignment operation after the connection of a fiber. Further the arrangement allows demountable coupling between the package and a fiber.

While I have described above the principles of my invention in connection with specific apparatus it is to be clearly understood that this description is made only by way of example and not as a limitation to the scope of my invention as set forth in the objects thereof and in the accompanying claims. I claim:

1. An arrangement to connect a laser to an optical fiber transmission line comprising:

a housing having a longitudinal axis and a substantially cup-shaped configuration with a hole in a bottom wall thereof coaxial of said axis; and a laser mounted within said housing coaxial of said axis adjacent one end of a length of a first optical fiber transmission line mounted in a first ferrule having a given diameter, said first ferrule being disposed coaxial of said axis, said first ferrule and said first optical fiber transmission line extending through said hole, the other end of said first optical fiber transmission line being mated with an end of a second optical fiber transmission line externally of said housing, said second optical fiber transmission line being coaxial of said axis;

said first ferrule including a watch jewel at each of its ends to engage and locate the two ends of said first optical fiber transmission line, and a flange adjacent said one end of said first optical fiber transmission line within said housing engaging said bottom wall in a sealed relationship.

2. An arrangement according to claim 1, wherein said second optical fiber transmission line is mounted within a second ferrule having said given diameter and said first and second ferrules extend from opposite ends of a precision-bored tube contained in an enclosure therefore secured to said housing, said first and second ferrules abutting each other in said tube and being accurately aligned with each other by said tube.

3. An arrangement according to claim 1, wherein said housing further includes a transparent window coaxial of said axis and spaced from said bottom wall so said laser can be monitored.

4. An arrangement according to claim 3, wherein said second optical fiber transmission line is mounted within a second ferrule having said given diameter and said first and second ferrules extend from opposite ends of a precision-bored tube contained in an enclosure therefore secured to said housing, said first and second ferrules abutting each other in said tube and being accurately aligned with each other by said tube.

5. An arrangement according to claim 1, wherein said flange and said housing provide a connection to one electrode of said laser, and said other electrode of said laser is connected by a flying lead to a length of strip line mounted in but electrically insulated from said housing.

6. An arrangement according to claim 5, wherein said housing further includes a transparent window coaxial of said axis and spaced from said bottom wall so said laser can be monitored.

7. An arrangement according to claim 6, wherein said second optical fiber transmission line is mounted within a second ferrule having said given diameter and said first and second ferrules extend from opposite ends of a precision-bored tube contained in an enclosure therefore secured to said housing, said first and second ferrules abutting each other in said tube and being accurately aligned with each other by said tube.

8. An arrangement according to claim 5, wherein said second optical fiber transmission line is mounted within a second ferrule having said given diameter and said first and second ferrules extend from opposite ends of a precision-bored tube contained in an enclosure therefore secured to said housing, said first and second ferrules abutting each other in said tube and being accurately aligned with each other by said tube.